US009088055B2

(12) United States Patent
Adipietro et al.

(10) Patent No.: US 9,088,055 B2
(45) Date of Patent: Jul. 21, 2015

(54) MOBILE POWER SHARING

(75) Inventors: John M. Adipietro, Raleigh, NC (US); Darcee M. Kolevar-Brunson, Raleigh, NC (US); Thomas L. Cheney, Cary, NC (US); Paul C. Demshur, Okemos, MI (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 12/852,427

(22) Filed: Aug. 6, 2010

(65) Prior Publication Data
US 2012/0031963 A1 Feb. 9, 2012

(51) Int. Cl.
G06F 17/00 (2006.01)
H01M 10/46 (2006.01)
H02J 7/35 (2006.01)

(52) U.S. Cl.
CPC ............. *H01M 10/465* (2013.01); *H02J 7/35* (2013.01); *Y02E 10/566* (2013.01)

(58) Field of Classification Search
USPC .......................................... 235/375; 320/101
See application file for complete search history.

(56) References Cited

U.S. PATENT DOCUMENTS

| 4,942,723 | A | | 7/1990 | Wassell |
| 5,039,930 | A | | 8/1991 | Collier et al. |
| 5,725,062 | A | * | 3/1998 | Fronek ............................ 180/2.2 |
| 6,034,320 | A | | 3/2000 | Malcherczyk et al. |
| 6,184,057 | B1 | | 2/2001 | Van Andel et al. |
| 6,380,481 | B1 | | 4/2002 | Muller |
| 6,653,553 | B2 | | 11/2003 | Reimer |
| 7,408,480 | B2 | * | 8/2008 | Woo et al. ...................... 340/928 |
| 7,622,667 | B2 | | 11/2009 | Chittibabu et al. |
| 8,387,318 | B2 | | 3/2013 | Kaufman |
| 2004/0065025 | A1 | | 4/2004 | Durham |
| 2008/0100258 | A1 | | 5/2008 | Ward |
| 2008/0143292 | A1 | | 6/2008 | Ward |
| 2008/0163919 | A1 | * | 7/2008 | Fein et al. ...................... 136/244 |
| 2009/0211621 | A1 | | 8/2009 | LeBlanc |

FOREIGN PATENT DOCUMENTS

CN 200983563 11/2007

OTHER PUBLICATIONS

"Solar-Power-Augmented Prius Takes the Grid Out of 'Plug-in,'" Aug. 15, 2005, 2 pages, www.webcache.googleusercontent.com.

(Continued)

*Primary Examiner* — Rafferty Kelly
(74) *Attorney, Agent, or Firm* — Kunzler Law Group

(57) ABSTRACT

An apparatus may include a vehicle cover having a plurality of photovoltaic cells, an inverter, a vehicle battery connector, a plug, and a switch assembly configured to operatively couple the inverter selectively to one of the vehicle battery connector and the plug based, at least in part, on a charge level of the battery. Another apparatus may include a receptacle configured to receive a plug having an identification tag; an identification tag reader to obtain, from the identification tag, identification data associated with a customer of a power company providing a power distribution system; and a controller to receive the identification data and provide the identification data to an account server associated with the power company. A method may include receiving a plug including an identification tag, reading identification data, contacting an account server, and providing the identification data to the account server.

6 Claims, 4 Drawing Sheets

(56) References Cited

OTHER PUBLICATIONS

Martin Eberhard, "The Next Leg of the Race," Aug. 15, 2007, 63 pages, www.teslamotors.com.
IBM, "Multi function green charging appliance," Sep. 11, 2009, 3 pages, IP.com Prior Art Database.
"MINILUX Concept Car Serves the Grid When Parked," Oct. 20, 2009, 1 page, www.solarfeeds.com.
Justin Vandersteen, "RE: With V2G, hybrid-electric cars send stored power back to the grid for cash," Feb. 22, 2010, 1 page, www.smartplanet.com.
Edward J. Simburger et al., "Prius White Paper," at least as early as Apr. 11, 2010, 8 pages, www.solarelectricalvehicles.com.
"Another real-world solar vehicle," at least as early as Apr. 11, 2010, 1 page, www.solarvan.co.uk.

\* cited by examiner

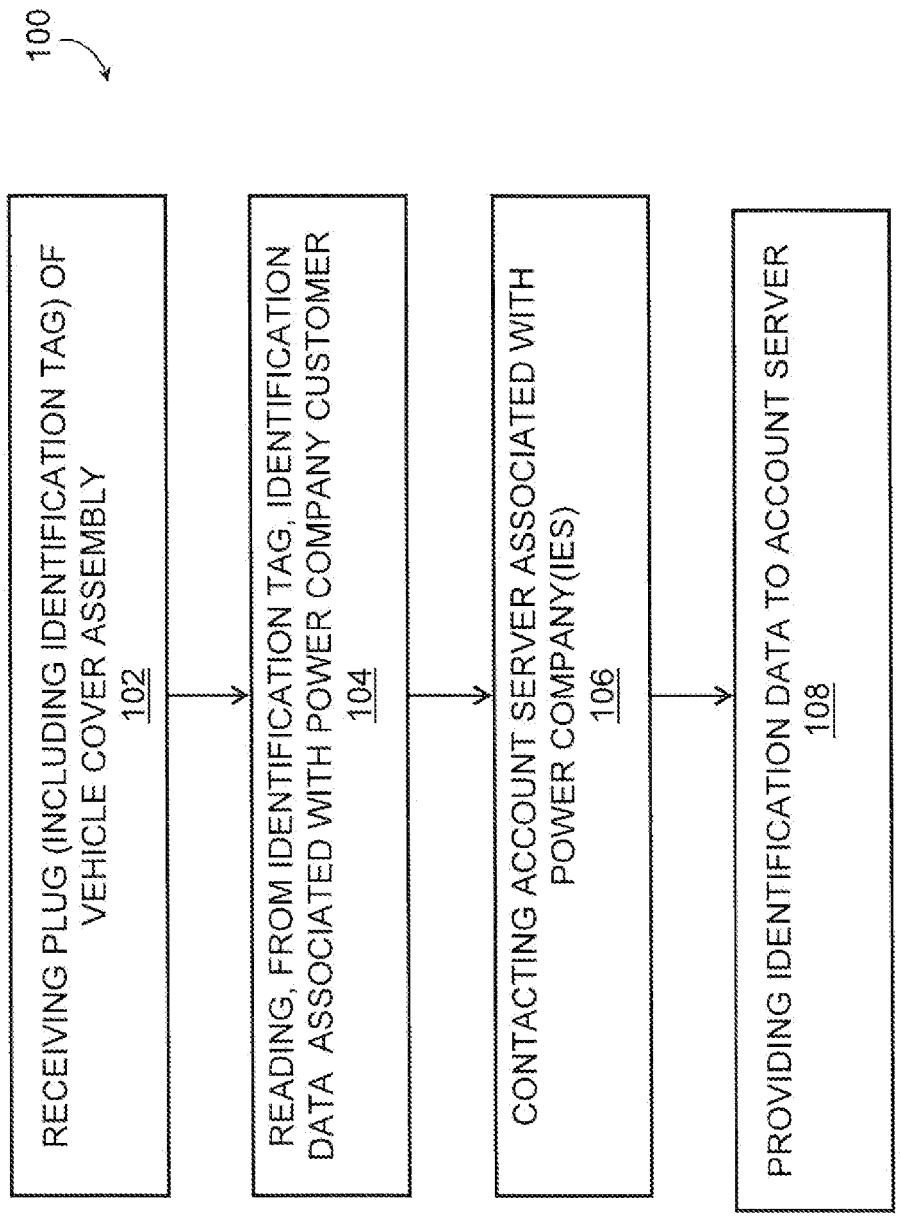

MOBILE POWER SHARING

BACKGROUND

The present invention relates to mobile devices that collect light and generate solar power and the sharing of that power with power distribution systems. More specifically the present invention relates to vehicle covers having photovoltaic cells and smart plugs that connect to power distribution systems allowing the vehicle covers to charge a battery of the vehicle and to share excess power with the power distribution systems. Photovoltaic cells generate direct current electrical power from electromagnetic radiation received by those cells, such as electromagnetic radiation received from sunlight. Vehicles may be parked outdoors for periods of time on sunny days. Some of those vehicles may include electrical vehicles or hybrid vehicles, which may require large amounts of power to maintain operation.

BRIEF SUMMARY

According to one embodiment of the present invention, an apparatus may include a vehicle cover configured to cover at least, an upwardly exposed portion of a vehicle; a plurality of photovoltaic cells operatively coupled to the vehicle cover and configured to convert light into direct current electrical power; an inverter configured to convert the direct current into an alternating current; a vehicle battery connector configured to be electrically connected selectively to a battery of the vehicle; a plug configured to be electrically connected selectively to a power distribution system; and a switch assembly configured to operatively couple the inverter selectively to one of the vehicle battery connector and the plug based, at least in part, on a charge level of the battery.

According to another embodiment, of the present invention, an apparatus may include a receptacle configured to receive a plug of a vehicle cover assembly having a plurality of photovoltaic cells, the plug including an identification tag; an identification tag reader mounted proximate to the receptacle and configured to read the identification tag while the plug is received in the receptacle and to obtain, from the identification tag, identification data associated with a customer of a power company providing a power distribution system; and a controller operatively coupled to the identification tag reader to receive the identification data and provide the identification data to an account server associated with the power company.

According to a further embodiment of the present invention, a method may include receiving a plug of a vehicle cover assembly having a plurality of photovoltaic cells, the plug including an identification tag; reading, from the identification tag, identification data associated with a customer of a power company providing a power distribution system; and contacting an account server associated with the power company; and providing the identification data to the account server.

BRIEF DESCRIPTION OF THE SEVERAL VIEWS OF THE DRAWINGS

FIG. 5 depicts an exemplary method of receiving a plug, of the vehicle cover assembly of FIG. 2 and reading identification data from that plug.

DETAILED DESCRIPTION

Figure 1:
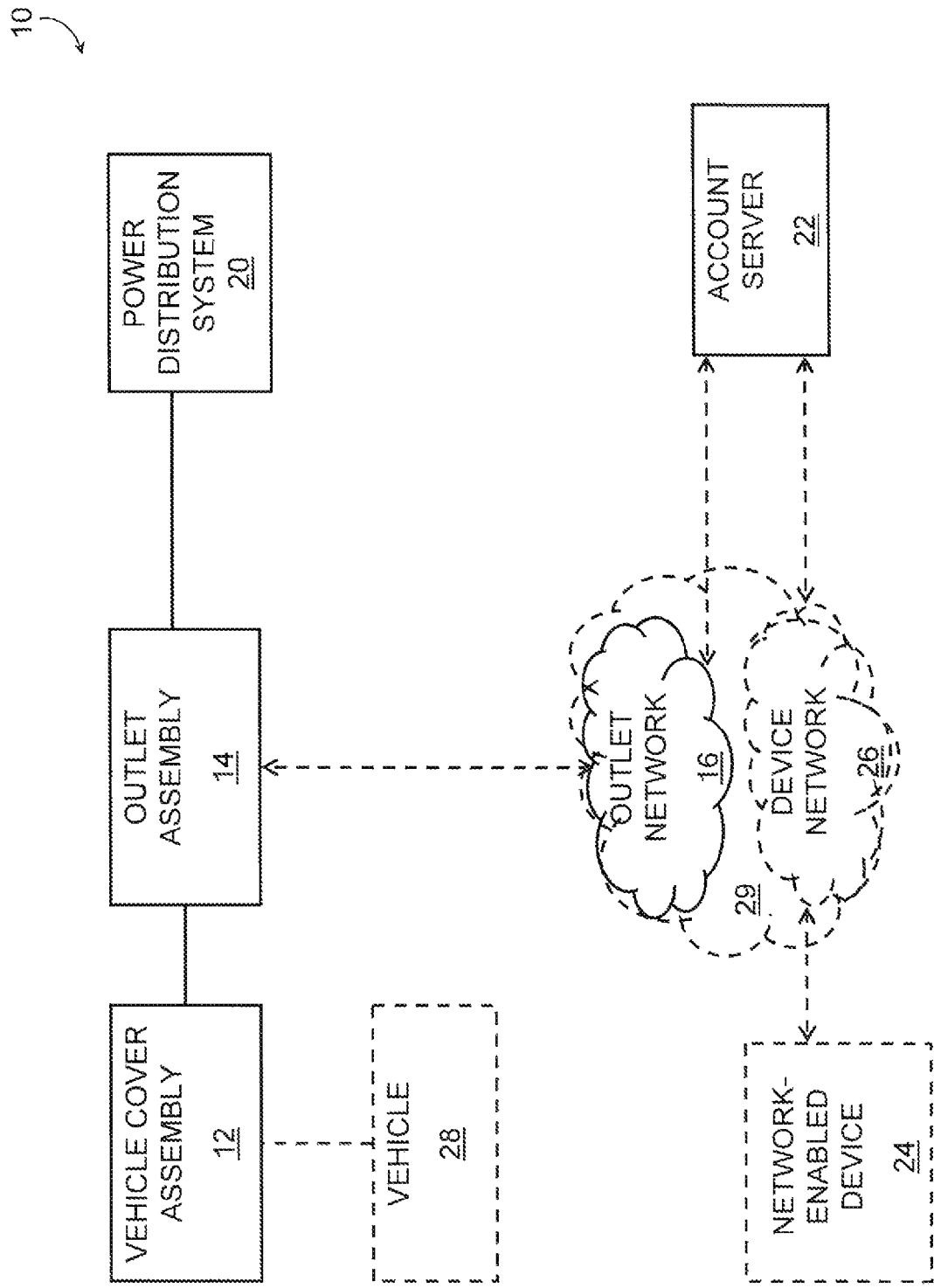
FIG. 1 depicts schematically an exemplary mobile power sharing system.

Referring to FIG. 1, an exemplary mobile power sharing system 10 is depicted. System 10 may include a vehicle cover assembly 12, an outlet assembly 14, an outlet network 16, a power distribution system 20, and an account server 22. The mobile power sharing system may include additional components, such as a network-enabled device 24 and a device network 26. Network-enabled device 24 may include a personal computer, a laptop computer, a palmtop computer, a tablet computer, a smart phone, a personal data assistant, a netbook, or other suitable computing device. In some embodiments, the network-enabled device may be associated with or incorporated in the vehicle. Although outlet assembly 14 and network-enabled device 24 are shown to be connected to separate networks, namely outlet network 16 and device network 26, these networks may be the same general network 29 shown in dashed lines. Networks 16, 26 and 29 may be any appropriate network, such as a local-area network (LAN), a virtual private network (VPN), a wide area network (WAN), such as the World Wide Web.

Any suitable persons and/or entities may own one or more components of mobile power sharing system 10. For example, a user may own, rent, and/or operate vehicle cover assembly 12 and/or network-enabled device 24, a parking and/or charging facility owner may own and/or operate outlet assembly 14, and one or more power companies may own and/or operate power distribution system 20 (such as a power grid) and account server 22. The user may be a customer of one or more of the power companies and have an account with that company or another company that interfaces with the power companies. The account server may store information about the account to allow the network-enabled device and/or outlet assembly to access the account. The account server may be owned and operated by one or more of the power companies, by the parking and/or charging facility owner, or by a third party.

A user may create an account with a power company or other account-maintaining company via network-enabled device 24 and include in that account one or more customer-selected settings that may direct how vehicle cover assembly 12 interacts with other components of system 10. For example, customer-selected settings may include (a) whether the customer desires to direct power from vehicle cover assembly 12 to power distribution system 20, (b) one or more time periods to provide power from the vehicle cover assembly to the power distribution system, and/or (c) a set price for providing power to the power distribution system. A user may obtain any suitable information regarding the account via network-enabled device 24, such as an amount of power provided to the power distribution system and the credit to the account for that provided power, the amount of power drawn from the power distribution system and the debit to the account for that drawn power, etc. A website and/or social media may provide the above information regarding the account.

Additionally, the user may access the account and associate an identifier associated with the vehicle cover assembly with that account. In some embodiments, the user may register for and/or purchase an identifier and associate it with the vehicle cover assembly. Moreover, a user may store credit card information, debit card information, and/or other information with the account, and/or may associate the account with another local utility account. The user may alternatively create an account with the power or other company and/or include one or more customer-selected settings associated with that account via other methods that do not involve using network-enabled device 24, such as by filling out an application form and faxing or mailing that form to a power company or another company that owns and/or operates the account server.

Although particular persons and entities are shown to own and/or operate various components of mobile power sharing system 10, any suitable persons and/or entities may own and/or operate any suitable components or combination of components. For example, the parking and/or charging facility owner may own and/or operate power distribution system 20 (such as a local power storage and/or distribution system that may connect and sell power to a power grid), and/or account server 22. Additionally, a third party administrator may own and/or operate account server 22.

Figure 2:
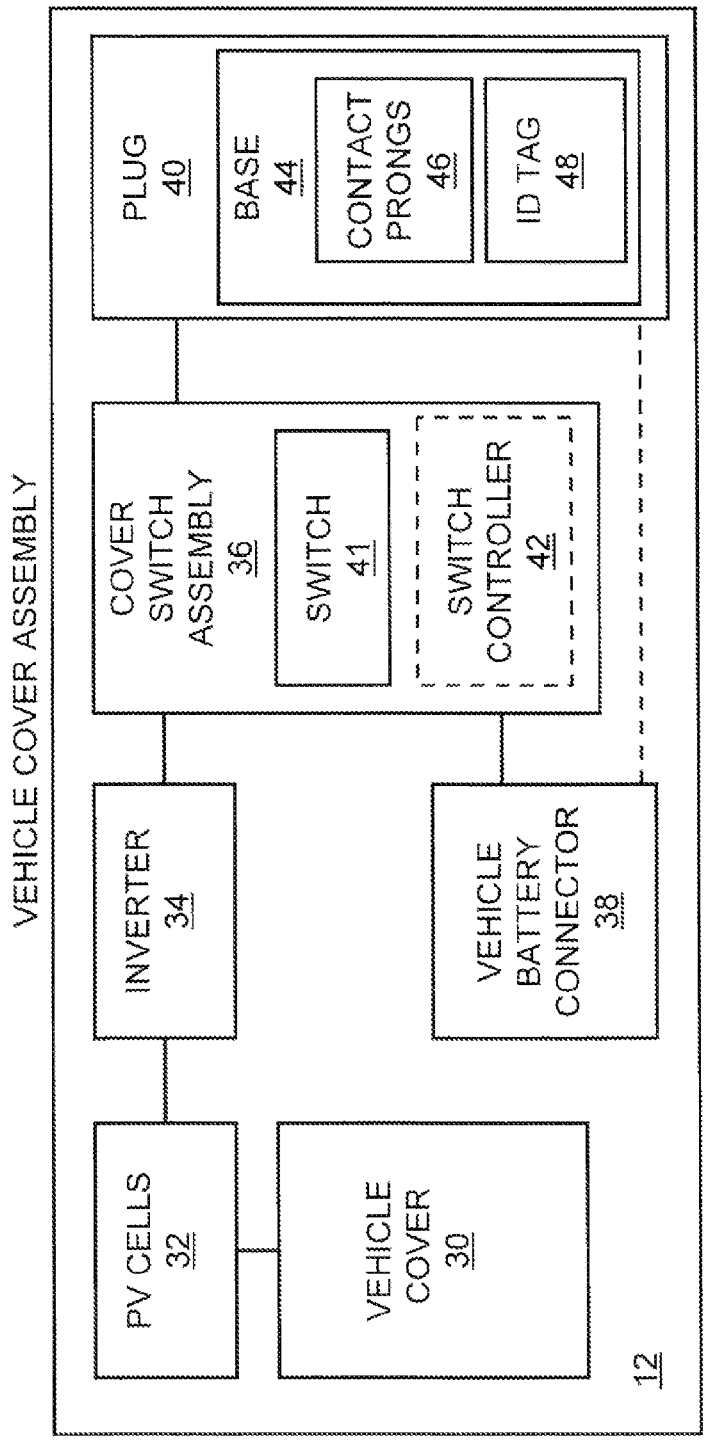
FIG. 2 depicts schematically an exemplary vehicle cover assembly of the mobile power sharing system of FIG. 1.

The vehicle cover assembly may include any suitable structure configured to cover at least a portion of a vehicle 28, and/or generate an electric current and/or direct that current to a battery of the vehicle or the power distribution system. For example, as shown in FIG. 2, vehicle cover assembly 12 may include a vehicle cover 30, a plurality of photovoltaic (PV) cells 32, an inverter 34, a cover switch assembly 36, a vehicle battery connector 38, and a plug 40.

Vehicle cover 30 may cover any suitable portions of vehicle 28, such as top, side, front, and/or back portions of the vehicle. For example, the vehicle cover may be configured to cover at least a top or upwardly facing portion of the vehicle. The vehicle cover may be a single cover or may be in two or more parts. Any suitable fasteners may attach or connect those parts together, or otherwise support the vehicle cover on a vehicle.

PV cells 32 may be operatively coupled to or suitably mounted on the vehicle cover and may be configured to convert light into direct current electric power, such as 12 volts power. For example, strips of flexible solar panels having the PV cells may be attached to the vehicle cover at any suitable portions of the cover. Inverter 34 may be configured to receive direct current from PV cells 32 and to convert the direct current into an alternating current. The inverter may be referred to as "stepping-up" direct current power to standard alternating current power, such as 120 volts power.

Cover switch assembly 36 may include any suitable structure configured to detect one or more conditions associated with the vehicle, the vehicle cover assembly, and/or the outlet assembly. For example, the cover switch assembly may detect a charge level of the vehicle's battery such as whether the charge level of the battery is below a first threshold charge level, between the first threshold charge level and a second threshold charge level, or above a second threshold charge level. The first and threshold charge levels may be any suitable charge levels. For example, a first threshold charge level may be 12.25 volts and a second threshold charge level may be 12.65 volts. Additionally, cover switch assembly 36 may detect a current level being received from inverter 34, such as whether the current level is below or above a threshold current level. The threshold current level may, for example, be a minimum current level required to charge the vehicle battery using the PV cells.

The cover switch assembly may operatively couple and/or uncouple components of the vehicle cover assembly based, at least in part, on (or responsive, at least in part to) the detected condition(s). For example, cover switch assembly 36 may operatively couple the inverter selectively to one of the vehicle battery connector and the plug, and/or to operatively uncouple the inverter selectively from one of the vehicle battery connector and the plug.

Cover switch assembly 36 may, for example, be responsive, at least in part to, the charge level of the vehicle battery for operatively coupling inverter 34 to vehicle battery connector 38 in response to the battery charge level being below the first threshold charge level. Additionally, cover switch assembly may be responsive, at least in part, to the charge level of the vehicle battery for operatively coupling inverter 34 to plug 40 in response to the battery charge level being above the second threshold charge level. Moreover, the cover switch assembly may be responsive, at least in part, to the charge level of the vehicle battery for operatively uncoupling inverter 34 from vehicle battery connector 38, and coupling the vehicle battery connector to plug 40. Furthermore, cover switch assembly 36 may be responsive to the current level being received from inverter 34 for operatively coupling plug 40 to vehicle battery connector 38 in response to the current level being below the threshold current level. The cover switch assembly may include any suitable structure to perform one or more of the above functions, such as at least one cover switch 41. Additionally, the cover switch assembly may include sensors, detectors, etc.

In some embodiments, the cover switch assembly may include a switch controller 42 configured to control switch 41. The switch controller may receive inputs from inverter 34 and/or vehicle battery connector 38 regarding detected conditions, such as the conditions discussed above. Based, at least in part, on those detected conditions, switch controller 42 may control switch 41 to operatively couple and/or uncouple components of the vehicle cover assembly, such as discussed above.

Vehicle battery connector 38 may include any suitable structure configured to be electrically connected selectively to a battery of vehicle 28. The vehicle battery connector may be configured to be received in a battery charging receptacle of the vehicle, connected to a power management system of the vehicle, or directly connected to the vehicle battery. Similarly, plug 40 may include any suitable structure configured to be electrically connected selectively to power distribution system 20.

In some embodiments, vehicle cover assembly 12 may include a direct electrical connection between vehicle battery connector 38 and plug 40, as shown in dashed lines in FIG. 2. The direct connection may provide a user the ability to connect the vehicle's battery to the outlet assembly without connecting and/or using other components of the vehicle cover assembly, such as the vehicle cover, the PV cells, etc. For example, a user may want to charge the vehicle's battery without placing the vehicle cover over the vehicle and/or without the PV cells generating direct current power from electromagnetic radiation. In some embodiments, the vehicle battery connector, plug, and/or the connection between those two components may be separable from the other components of the vehicle cover assembly, such as in a Y-cable design or other suitable design.

Figure 3:
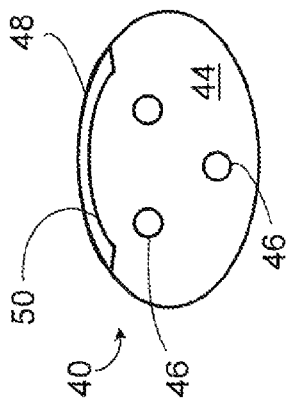
FIG. 3 depicts simplistically an end view of an exemplary plug of the vehicle cover assembly of FIG. 2 having an identification tag.

Referring now to FIG. 3, an exemplary plug 40 may include a base 44, two or more contact prongs 46 that extend from the base, and at least one identification tag 48. The base also may include a slot 50 configured to receive the identification tag. Although plug 40 is shown to include contact prongs 46 with a particular orientation, the contact prongs may have any suitable shape(s) and/or orientation(s) configured to be received in outlet assembly 14.

Identification tag 48 may include any suitable identification tag containing identification data associated with a customer of a power company providing power distribution system 20. For example, the identification data may identify or otherwise be relatable to an account of that customer on account server 22. Identification tag 48 may include, for example, a radio-frequency identification (RFID) tag, a barcode tag, a tag with biometric information, etc. The RFID tag may be either a passive RFID tag or an active RFID tag. Although identification tag 48 is shown to be received in slot 50 of base 44, the identification tag may be supported by or be in any suitable portion(s) of base 44 that may be read by outlet assembly 14. Plug 40 with identification tag 48 may be referred to as a "smart plug."

Figure 4:
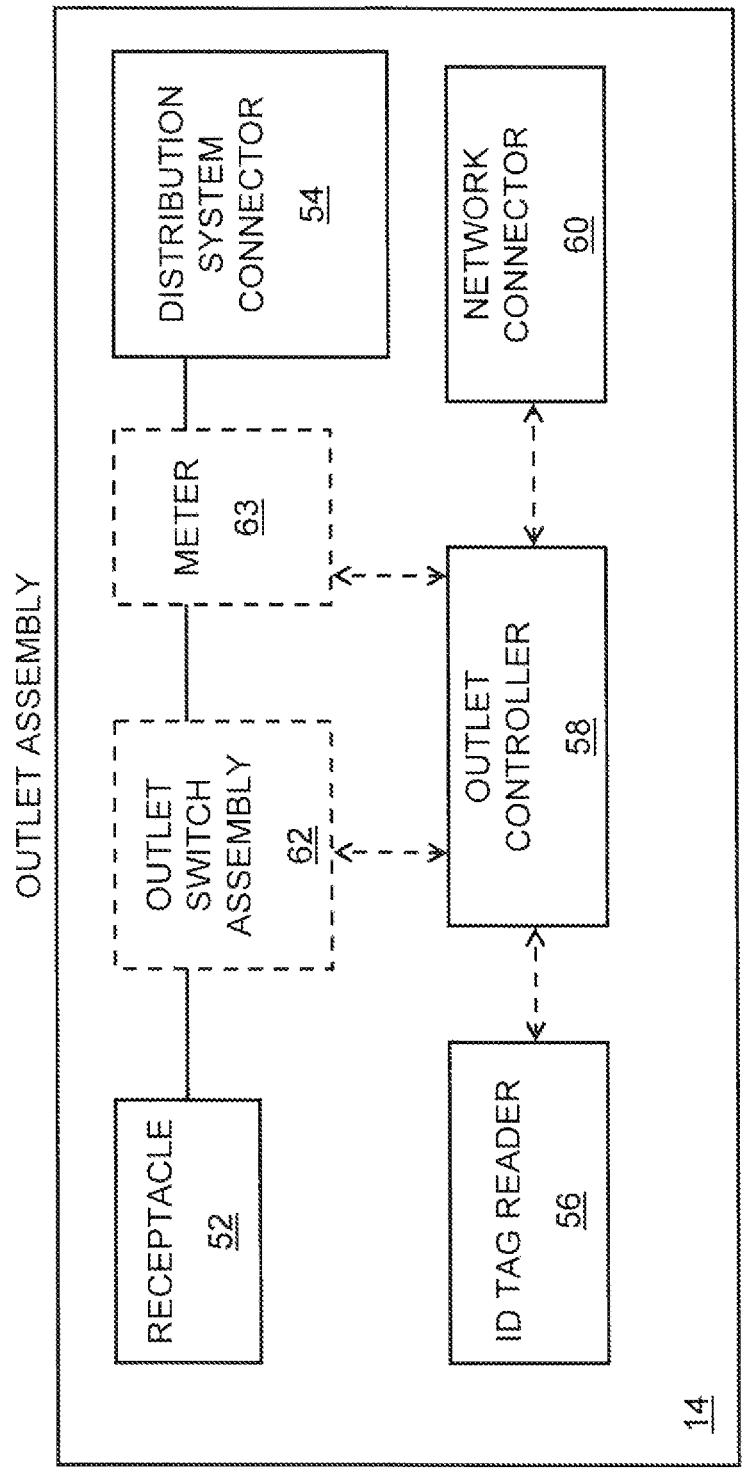
FIG. 4 depicts schematically an exemplary outlet assembly of the mobile power sharing system of FIG. 1.

Referring now to FIG. 4, outlet assembly 14 may include any suitable structure configured to receive plug 40 and read identification tag 48 to obtain identification data from that tag. For example, the outlet assembly may include a receptacle 52, a distribution system connector 54, an identification tag reader 56, an outlet controller 58, and a network connector 60. The receptacle may be configured to receive plug 40 having identification tag 48. Distribution system connector 54 electrically connects receptacle 52 with power distribution system 20. The distribution system connector may include a conductor associated with the power distribution system.

Identification tag reader 56 may include any suitable structure configured to read identification tag 48, and to obtain, from the identification tag, identification data associated with a customer of a power company providing power distribution system 20. For example, the identification tag reader may be a radio-frequency identification reader configured to read radio-frequency identification tags and/or may be one or more other suitable readers, such as a barcode reader, a biometric data reader, etc. Identification tag reader 56 may be mounted proximate to receptacle 52 to allow that reader to read identification tag 48 while plug 40 is received in the receptacle.

Outlet controller 58 may be operatively coupled to identification tag reader 56 and may receive identification data from that reader. Additionally, the outlet controller may provide the identification data to account server 22 associated with the power company(ies) via network connector 60. Network connector 60 may include Ethernet-on-a-chip and/or other suitable devices configured to provide communication via the outlet network. In some embodiments, outlet assembly 14 may include an outlet switch assembly 62, which may include any suitable device configured to operatively couple receptacle 52 to a conductor associated with power distribution system 20 via distribution system connector 54. For example, the outlet switch assembly may include sensors, detectors, switches, contactor devices, etc.

Outlet controller 58 may be configured to receive account data (such as one or more customer-selected settings) associated with a customer's account from the account server, and to control outlet switch assembly 62 based on the account data. For example, when the customer-selected setting includes a set price for providing power, the controller may be configured to control the switch assembly based on whether the account will receive at least the set price for the power provided from the vehicle cover assembly to the power distribution system.

Additionally, the controller may be configured to determine if a customer is authorized to have the vehicle cover assembly connected to the power distribution system based on a status of the account of the customer, and to control the outlet switch assembly based on that status. For example, the controller may check with the account server to determine if the customer has kept the account current and/or does not have a balance owing that is over a threshold time period or amount.

If the customer's account is current, the outlet controller may control the outlet switch assembly to establish an electrical connection between the receptacle and the distribution system connector. The outlet controller also may send a signal to the account server, or to a meter, to start that meter. In some examples, outlet switch assembly 62 may include a meter 63 operatively coupled to the outlet controller for monitoring power flow to or from the power distribution system, such as power being conducted through the receptacle. However, if the customer's account is not current and has a balance that is over a threshold time period, then the outlet switch assembly may prevent, via the outlet switch assembly, the electrical connection between the receptacle and the distribution system connector.

The outlet controller may disconnect the electrical connection between the receptacle and the distribution system connector based, at least in part, on any suitable condition(s), such as when the meter no longer detects an electric current between the receptacle and the distribution system connector or when the plug has been removed. Additionally, the outlet controller may communicate with the account server (or the meter) to stop the meter and/or send usage data from the meter to the account server. The account server may debit or credit the account based on current utility rates and/or other rates.

Outlet assembly 14 may include other components, such as conduits, cables, power lines, Ethernet switches, and utility tie inverters. For example, the outlet assembly may include one or more indicators to indicate to a user whether an electrical connection was made to the power distribution system. The indicators may be adjacent the receptacle and/or in any suitable locations. When the outlet assembly includes an identification tag reader and a controller, the outlet assembly may be referred to as a "smart outlet." When a power distribution system includes one or more smart outlets, the power distribution system may be referred to as a "smart grid."

Referring now to FIG. 5, an exemplary method 100 of receiving a plug of the vehicle cover assembly and reading identification data from that plug is shown. While FIG. 5 shows exemplary steps of a method according to one embodiment, other embodiments may omit, add to, and/or modify any of the steps shown in that figure. In step 102, a plug of a vehicle cover assembly is received. The plug may include an identification tag, such as an RFID tag. In step 104, identification data from the identification tag may be read. The identification data may be associated with a customer of a power company. When the identification tag is an RFID tag, then the identification data is read from the RFID tag.

In step 106, an account server, such as account server 22 associated with power company(ies), may be contacted. In step 108, the identification data may be provided to the account server. Method 100 may include other steps. For example, method 100 may include receiving alternating current from a vehicle cover assembly, and/or directing the alternating current to a power distribution system. Additionally, method 100 may include verifying, based on status of an account of the customer on the account server, whether a vehicle cover assembly should be connected to a power distribution system, and/or electrically connecting a plug selectively to a conductor associated with the power distribution system based on authorization from the account server.

Moreover, method 100 may include verifying, based on one or more customer-selected settings of an account of a customer on an account server, whether a vehicle cover assembly should be connected to a power distribution system, and/or electrically connecting a plug selectively to a conductor of the power distribution system based on the customer-selected settings. The verifying step may include determining whether the customer desires to direct power from the vehicle cover assembly to the power distribution system, one or more time periods to provide power from the vehicle cover assembly to the power distribution system, and/or whether at least a customer-selected set price for providing power will be credited to the account when power from the vehicle cover assembly is received by the power distribution system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or clusters thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

receiving a plug of a vehicle cover assembly having a plurality of photovoltaic cells and an inverter, the plug including an identification tag, the vehicle cover assembly being configured to be supported on a vehicle and to cover two or more of top, side, front, and back portions of the vehicle;

reading, from the identification tag, identification data associated with a customer of a power company providing a power distribution system;

contacting an account server associated with the power company;

providing the identification data to the account server;

receiving the alternating current from the inverter of the vehicle cover assembly, the inverter receiving power from the plurality of photovoltaic cells while power is generated by the photovoltaic cells; and directing the alternating current from the inverter though the plug to the power distribution system.

2. The method of claim 1, where the identification tag includes a RFID tag, wherein reading identification data from the identification tag includes reading identification data from the RFID tag.

3. The method of claim 1, further comprising:

verifying, based on status of an account of the customer on the account server, whether the vehicle cover assembly should be connected to the power distribution system; and electrically connecting the plug selectively to a conductor associated with the power distribution system based on authorization from the account server.

4. The method of claim 1, further comprising:

verifying, based on one or more customer-selected settings of an account of the customer on the account server, whether the vehicle cover assembly should be connected to the power distribution system; and electrically connecting the plug selectively to a conductor associated with the power distribution system based on the one or more customer-selected settings.

5. The method of claim 4, wherein verifying, based on one or more customer-selected settings of the account, whether the vehicle cover assembly should be connected to the power distribution system includes determining at least one of (a) whether the customer desires to direct power from the vehicle cover assembly to the power distribution system, and (b) one or more time periods to provide power from the vehicle cover assembly to the power distribution system.

6. The method of claim 4, wherein verifying, based on one or more customer-selected settings of the account, whether the vehicle cover assembly should be connected to the power distribution system includes determining whether at least a customer-selected set price for providing power will be credited to the account when the power from the vehicle cover assembly is received by the power distribution system.

* * * * *